(12) United States Patent
Park et al.

(10) Patent No.: US 10,872,594 B2
(45) Date of Patent: Dec. 22, 2020

(54) DEVICE AND METHOD FOR STEREO NOISE CANCELLATION

(71) Applicant: Sogang University Research & Business Development Foundation, Seoul (KR)

(72) Inventors: Hyung Min Park, Seoul (KR); Byung Joon Cho, Seoul (KR)

( * ) Notice: Subject to any disclaimer, the term of this patent is extended or adjusted under 35 U.S.C. 154(b) by 0 days.

(21) Appl. No.: 16/265,404

(22) Filed: Feb. 1, 2019

(65) Prior Publication Data
US 2020/0058286 A1  Feb. 20, 2020

(30) Foreign Application Priority Data

Aug. 27, 2018 (KR) .................. 10-2018-0100323
Aug. 27, 2018 (KR) .................. 10-2018-0100370

(51) Int. Cl.
*G10K 11/178* (2006.01)

(52) U.S. Cl.
CPC .. *G10K 11/17853* (2018.01); *G10K 11/17823* (2018.01); *G10K 2210/3028* (2013.01)

(58) Field of Classification Search
CPC ......... G10K 2210/3028; G10K 11/178; G10K 11/17823; G10K 11/17853; G10K 2210/1081; G10K 11/17855; G10K 11/17881; G10K 11/17885; G10K 2210/1281; G10K 2210/3011; G10K 2210/30232; G10K 2210/3055; H04M 9/082; H04R 3/02; H04R 27/00; H04R 1/342; H04R 1/345; G10L 21/0208; G10L 2021/02082; H04S 3/00

USPC .... 379/406.01, 406.08, 406.14, 202.01, 286, 379/406.05, 406.09, 406.12, 406.13; 381/66, 71.1, 71.6, 119, 71.8, 93; 700/94; 704/E21.004; 708/322
See application file for complete search history.

(56) References Cited

U.S. PATENT DOCUMENTS 9,143,862 B2 * 9/2015 Li ........................... H04R 5/04

FOREIGN PATENT DOCUMENTS

KR       10-1133308         4/2012

OTHER PUBLICATIONS

English Specification of 10-1133308.

* cited by examiner

*Primary Examiner* — Duc Nguyen
*Assistant Examiner* — Alexander L Eljaiek
(74) *Attorney, Agent, or Firm* — Antonio Ha & U.S. Patent, LLC

(57) ABSTRACT

According to an embodiment, a noise cancellation method comprises updating a first far-end channel filter according to a first variance yielded based on an input signal and a first far-end signal included in the input signal, providing a first output signal obtained by removing a first far-end noise signal from the input signal through the first far-end channel filter, updating a second far-end channel filter according to a second variance yielded based on the first output signal and a second far-end signal included in the input signal, and providing a second output signal obtained by removing a second far-end noise signal from the first output signal through the second far-end channel filter.

17 Claims, 18 Drawing Sheets

DEVICE AND METHOD FOR STEREO NOISE CANCELLATION

CROSS-REFERENCE TO RELATED APPLICATION(S)

This application is based on and claims priority under 35 U.S.C. § 119 to Korean Patent Application Nos. 10-2018-0100323, filed on Aug. 27, 2018, and 10-2018-0100370, filed on Aug. 27, 2018, in the Korean Intellectual Property Office, the disclosures of which are incorporated by reference herein in their entireties.

TECHNICAL FIELD

Embodiments of the disclosure relate to methods and devices for noise cancellation.

DISCUSSION OF RELATED ART

Voice may be input to a microphone and then output through a speaker. In this case, the sound output from the speaker may enter the microphone, creating noise. In a scenario case where voice is delivered to an audience through multiple speakers, a plurality of noise signals may come into the microphone. There are ongoing research efforts to remove noise due to stereo echo signals.

SUMMARY

According to an embodiment, there may be provided a noise cancellation method for removing stereo echo signals.

According to an embodiment, there may be provided a noise cancellation device for removing stereo echo signals.

According to an embodiment, a noise cancellation method comprises updating a first far-end channel filter according to a first variance yielded based on an input signal and a first far-end signal included in the input signal, providing a first output signal obtained by removing a first far-end noise signal from the input signal through the first far-end channel filter, updating a second far-end channel filter according to a second variance yielded based on the first output signal and a second far-end signal included in the input signal, and providing a second output signal obtained by removing a second far-end noise signal from the first output signal through the second far-end channel filter.

Updating the first far-end channel filter may include estimating the first variance based on the input signal and the first far-end signal and creating a first cross-correlation vector and a first autocorrelation matrix based on the first variance.

An initial value of the first variance may be obtained by cross correlation between the input signal and the first far-end signal and autocorrelation of the first far-end signal.

The first cross-correlation vector and the first autocorrelation matrix may be updated according to the first variance.

The first far-end channel filter may be updated according to the first cross-correlation vector and the first autocorrelation matrix.

Updating the second far-end channel filter may include estimating the second variance based on the first output signal and the second far-end signal and creating a second cross-correlation vector and a second autocorrelation matrix based on the second variance.

An initial value of the second variance may be obtained by cross correlation between the output signal and the second far-end signal and autocorrelation of the second far-end signal.

The second cross-correlation vector and the second autocorrelation matrix may be updated according to the second variance.

The second far-end channel filter may be updated according to the second cross-correlation vector and the second autocorrelation matrix.

According to an embodiment, a stereo noise cancellation method comprises initializing a first variance based on an input signal and a first far-end signal included in the input signal, updating a first far-end channel filter according to the first variance, providing a first output signal obtained by removing a first far-end noise signal from the input signal through the first far-end channel filter, initializing a second variance of the first output signal and a second far-end signal included in the input signal, updating a second far-end channel filter according to the second variance, and providing a second output signal obtained by removing a second far-end noise signal from the first output signal through the second far-end channel filter.

The first far-end channel filter may be updated according to a first cross-correlation vector and a first autocorrelation matrix obtained based on the first variance.

According to an embodiment, a noise cancellation device comprises a first filter configured to update a first far-end channel filter according to a first variance yielded based on an input signal and a first far-end signal included in the input signal, a first output device configured to provide a first output signal obtained by removing a first far-end noise signal from the input signal through the first far-end channel filter, a second filter configured to update a second far-end channel filter according to a second variance yielded based on the first output signal and a second far-end signal included in the input signal, and a second output device configured to provide a second output signal obtained by removing a second far-end noise signal from the first output signal through the second far-end channel filter.

The second far-end channel filter may be updated according to a second cross-correlation vector and a second autocorrelation matrix obtained based on the second variance.

According to an embodiment, a noise cancellation device comprises a first initializer configured to initialize a first variance based on an input signal and a first far-end signal included in the input signal, a first filter configured to update a first far-end channel filter according to the first variance, a first output device configured to provide a first output signal obtained by removing a first far-end noise signal from the input signal through the first far-end channel filter, a second initializer configured to initialize a second variance of the first output signal and a second far-end signal included in the input signal, a second filter configured to update a second far-end channel filter according to the second variance, and a second output device configured to provide a second output signal obtained by removing a second far-end noise signal from the first output signal through the second far-end channel filter.

An initial value of the first variance may be obtained by cross correlation between the input signal and the first far-end signal and autocorrelation of the first far-end signal.

According to an embodiment, a mono noise cancellation method comprises updating a far-end channel filter according to a variance yielded based on an input signal and a far-end signal included in the input signal and providing an output signal obtained by removing a far-end noise signal from the input signal through the far-end channel filter.

Updating the far-end channel filter may include estimating the variance based on the input signal and the far-end signal and creating a cross-correlation vector and an auto-correlation matrix based on the variance.

According to various embodiments of the disclosure, the noise cancellation method may provide noise-free voice signals by removing stereo echo signals from signals input to a microphone.

the noise cancellation device may provide noise-free voice signals by removing stereo echo signals from signals input to a microphone.

According to an embodiment, a noise cancellation method comprises providing a first estimated output signal based on a first prior far-end channel filter corresponding to a prior frame, an input signal, and a first far-end signal, updating a first current far-end channel filter corresponding to a current frame according to the first estimated output signal and the first prior far-end channel filter, providing a first output signal obtained by removing a first far-end noise signal from the input signal using the first current far-end channel filter, providing a second estimated output signal based on a second prior far-end channel filter corresponding to the prior frame, the first output signal, and a second far-end signal, updating the second current far-end channel filter corresponding to the current frame according to the second estimated output signal and the second prior far-end channel filter, and providing a second output signal obtained by removing a second far-end noise signal from the first output signal using the second current far-end channel filter.

Updating the first current far-end channel filter may include estimating a first variance based on the first estimated output signal and creating a first inverse autocorrelation matrix based on the first variance.

The first variance may be determined by the first estimated output signal provided based on the first prior far-end channel filter.

The first variance may be determined by the product of a first weight and the square of the absolute value of the first estimated output signal.

The first current far-end channel filter may converge to a constant value.

Updating the second current far-end channel filter may include estimating a second variance based on the second estimated output signal and creating a second inverse autocorrelation matrix based on the second variance.

The second variance may be determined by the second estimated output signal provided based on the second prior far-end channel filter.

The second variance may be determined by the product of a second weight and the square of the absolute value of the second estimated output signal.

The second current far-end channel filter may converge to a constant value.

According to an embodiment, a stereo noise cancellation method comprises initializing a first variance, providing a first estimated output signal based on a first prior far-end channel filter corresponding to a prior frame, an input signal, and a first far-end signal and updating a first current far-end channel filter corresponding to a current frame according to the first estimated output signal, the first prior far-end channel filter, and the first variance;

providing a first output signal obtained by removing a first far-end noise signal from the input signal using the first current far-end channel filter; initializing a second variance;

providing a second estimated output signal based on a second prior far-end channel filter corresponding to the prior frame, the first output signal, and a second far-end signal and updating a second current far-end channel filter corresponding to a current frame according to the second estimated output signal, the second prior far-end channel filter, and the second variance, and providing a second output signal obtained by removing a second far-end noise signal from the first output signal using the second current far-end channel filter.

The first variance may be determined by the first estimated output signal provided based on the first prior far-end channel filter, and the second variance may be determined by the second estimated output signal provided based on the second prior far-end channel filter.

According to an embodiment, a noise cancellation device comprises a first estimator configured to provide a first estimated output signal based on a first prior far-end channel filter corresponding to a prior frame, an input signal, and a first far-end signal, a first filter configured to update a first current far-end channel filter corresponding to a current frame according to the first estimated output signal and the first prior far-end channel filter, a first output device configured to provide a first output signal obtained by removing a first far-end noise signal from the input signal using the first current far-end channel filter, a second estimator configured to provide a second estimated output signal based on a second prior far-end channel filter corresponding to the prior frame, the first output signal, and a second far-end signal, a second filter configured to update the second current far-end channel filter corresponding to the current frame according to the second estimated output signal and the second prior far-end channel filter, and a second output device configured to provide a second output signal obtained by removing a second far-end noise signal from the first output signal using the second current far-end channel filter.

The first variance may be determined by the product of a first weight and the square of the absolute value of the first estimated output signal, and the second variance may be determined by the product of a second weight and the square of the absolute value of the second estimated output signal.

According to an embodiment, a stereo noise cancellation device comprises a first initializer configured to initialize a first variance, a first updater configured to provide a first estimated output signal based on a first prior far-end channel filter corresponding to a prior frame, an input signal, and a first far-end signal and update a first current far-end channel filter corresponding to a current frame according to the first estimated output signal, the first prior far-end channel filter, and the first variance, a first output device configured to provide a first output signal obtained by removing a first far-end noise signal from the input signal using the first current far-end channel filter, a second updater configured to provide a second estimated output signal based on a second prior far-end channel filter corresponding to the prior frame, the first output signal, and a second far-end signal and update a second current far-end channel filter corresponding to a current frame according to the second estimated output signal, the second prior far-end channel filter, and the second variance, and a second output device configured to provide a second output signal obtained by removing a second far-end noise signal from the first output signal using the second current far-end channel filter.

The first current far-end channel filter and the second current far-end channel filter may converge to a constant value.

According to an embodiment, a mono noise cancellation method comprises providing an estimated output signal based on a prior far-end channel filter corresponding to a prior frame, an input signal, and a far-end signal, updating a current far-end channel filter corresponding to a current frame according to the estimated output signal and the prior far-end channel filter, and providing an output signal obtained by removing a far-end noise signal from the input signal using the current far-end channel filter.

Updating the current far-end channel filter may include estimating a variance based on the estimated output signal and creating an inverse autocorrelation matrix based on the variance.

The foregoing or other various aspects of the disclosure would be apparent to a skilled artisan from the following detailed description.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the disclosure will be described in detail with reference to the accompanying drawings. The disclosure, however, may be modified in various different ways, and should not be construed as limited to the embodiments set forth herein. The same reference denotations may be used to refer to the same or substantially the same elements throughout the specification and the drawings. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

Figure 1:
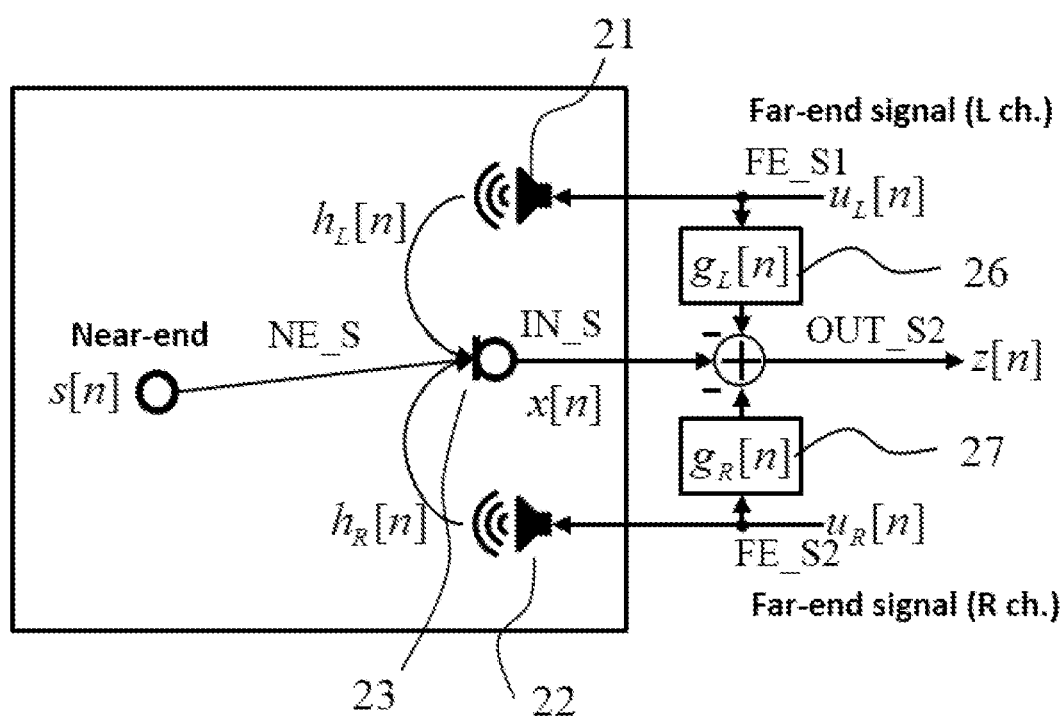
FIG. 1 is a view illustrating an embodiment of the disclosure.
Figure 2:
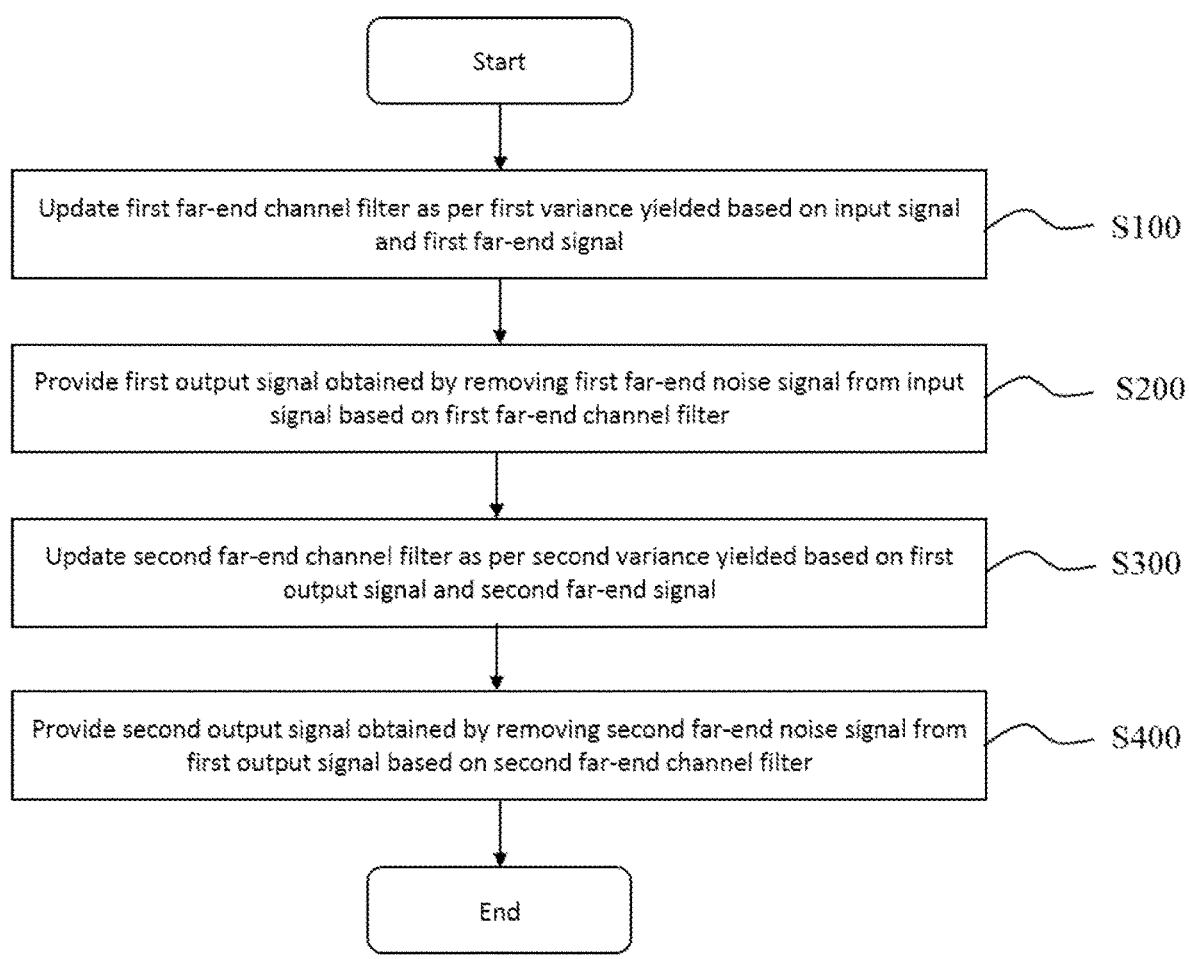
FIG. 2 is a flowchart illustrating a noise cancellation method according to an embodiment.

FIG. 1 is a view illustrating an embodiment of the disclosure. FIG. 2 is a flowchart illustrating a noise cancellation method according to an embodiment.

Referring to FIGS. 1 and 2, a noise cancellation method may include updating a first far-end channel filter 26 according to a first variance VAR1 yielded based on an input signal IN_S and a first far-end signal FE_S1 included in the input signal IN_S (S100). The input signal IN_S may include a near-end signal NE_S, the first far-end signal FE_S1, and a second far-end signal FE_S2.

For example, the near-end signal NE_S may be a pure voice signal free from stereo echo signals (e.g., FE_S1 and FE_S2). The first far-end signal FE_S1 may be an echo signal provided from a first sound source 21, e.g., a speaker, disposed on a first side from a microphone 23. The first side may be a left side of the microphone 23. The second far-end signal FE_S2 may be an echo signal provided from a second sound source 22, e.g., a speaker, disposed on a second side from the microphone 23. The second side may be a right side of the microphone 23.

According to an embodiment, the first far-end channel filter 26 and a second far-end channel filter 27 may be estimated based on a maximum likelihood scheme.

A second output signal OUT_S2 may be expressed as Z[m,k] and be represented in Equation 1 below.

$$Z[m,k] \approx X[m,k] - \sum_{l=0}^{M-1} G[l,k]U[m-l,k] = \qquad \text{[Equation 1]}$$

$$X[m,k] - g_k^H u_{m,k}$$

Here, X[m,k] is the input signal IN_S, $g_k$ is the far-end channel filter, and $u_{m,k}$ is the far-end signal.

Assuming that the second output signal OUT_S2 has the complex Gaussian distribution with zero mean and a variance of $\lambda_z[m,k]$, a first function may be represented in Equation 2 below.

$$p(Z[m,k];\lambda_z[m,k]) = \frac{1}{\pi\lambda_z[m,k]}\exp\left(-\frac{|Z[m,k]|^2}{\lambda_z[m,k]}\right) \quad \text{[Equation 2]}$$

Here, the first function is $p(Z[m,k];\lambda_z[m,k])$, m is the frame index, and k is the frequency index.

A parameter set to be obtained may be expressed as $\Theta=\{\lambda_z[m,k], g_k\}$, and the parameter set to be obtained through the maximum likelihood scheme may be represented in Equation 3.

$$L(\Theta) = \sum_m \log p(z[m,k];\Theta) = \quad \text{[Equation 3]}$$

$$-\sum_m\left(\log(\pi\lambda_z[m,k]) + \frac{|Z[m,k]|^2}{\lambda_z[m,k]}\right) =$$

$$-\sum_m\left(\log(\pi\lambda_z[m,k]) + \frac{|X[m,k]-g_k^H u_{m,k}|^2}{\lambda_z[m,k]}\right)$$

$g_k$ to maximize $L(\Theta)$ $g_k$ with $\lambda_z[m,k]$ left unchanged in Equation 3 may be represented in Equation 4 below.

$$\frac{\partial L(\Theta)}{\partial g_k} = \sum_m \frac{2u_{m,k}X^*[m,k] - 2u_{m,k}u_{m,k}^H g_k}{\lambda_z[m,k]} = 0 \quad \text{[Equation 4]}$$

$$g_k = R_k^{-1} r_k$$

$$r_k = \sum_m \frac{u_{m,k}X^*[m,k]}{\lambda_z[m,k]}$$

$$R_k = \sum_m \frac{u_{m,k}u_{m,k}^H}{\lambda_z[m,k]}$$

Here, $r_k$ and $R_k$ are the cross-correlation vector and the autocorrelation matrix, respectively.

$\lambda_z[m,k]$ to maximize $L(\Theta)$ with $g_k$ left unchanged may be represented in Equation 5 below.

$$\frac{\partial L(\Theta)}{\partial \lambda_z[m,k]} = -\frac{1}{\lambda_z[m,k]} + \frac{|X[m,k]-g_k^H u_{m,k}|^2}{\lambda_z^2[m,k]} = 0 \quad \text{[Equation 5]}$$

$$\lambda_z[m,k] = |X[m,k]-g_k^H u_{m,k}|^2$$

The process represented in Equations 1 to 5 may be repeated until $g_k$ and $\lambda_z[m,k]$ converge.

The first far-end channel filter 26 may remove the first far-end noise signal from the input signal IN_S, outputting a first output signal OUT_S1 which is free from the first far-end noise signal (S200). As used herein, the terms "far-end noise signal" and "far-end signal" may interchangeably be used.

For example, the first output signal OUT_S1 may be Y[m,k] and be represented in Equation 6.

$$Y[m,k] = X[m,k] - g_{L,k}^H u_{m,k} \quad \text{[Equation 6]}$$

Here, X[m,k] is the input signal IN_S, $g_{L,k}^H$ is the first far-end channel filter 26, and $u_{L,m,k}$ is the first far-end signal FE_S1.

The second far-end channel filter 27 may be updated according to a second variance VAR2 yielded based on the first output signal OUT_S1 and the second far-end signal included in the input signal IN_S (S300).

The second far-end channel filter 27 may remove the second far-end noise signal from the first output signal OUT_S1, outputting the second output signal OUT_S2 free from the second far-end noise signal (S400).

For example, the second output signal OUT_S2 may be Z[m,k] and be represented in Equation 7.

$$Z[m,k] = Y[m,k] - g_{R,k}^H u_{R,m,k} \quad \text{[Equation 7]}$$

Here, Y[m,k] is the first output signal OUT_S1, $g_{R,k}^H$ is the second far-end channel filter 27, and $u_{R,m,k}$ is the second far-end signal FE_S2.

According to an embodiment, the noise cancellation method may remove stereo echo signals from the input signal IN_S, providing noise-free voice signals.

Although examples of removing stereo echo signals are shown and described herein, embodiments of the disclosure are not limited thereto but may also be applicable to removal of mono echo signals.

Figure 3:
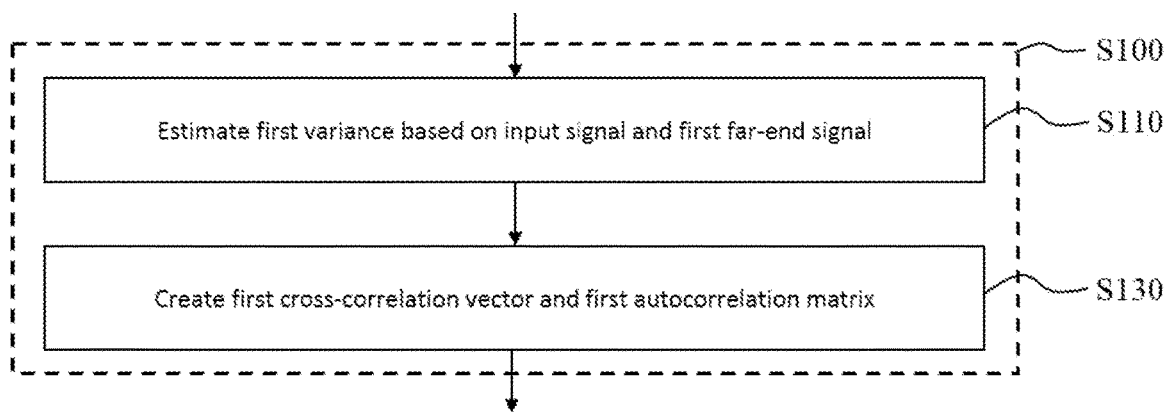
FIG. 3 is a flowchart illustrating an example of updating a first far-end channel filter according to an embodiment.
Figure 4:
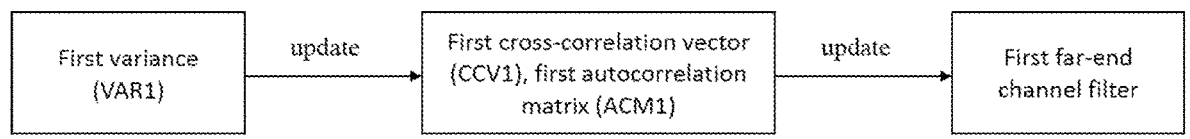
FIG. 4 is a view illustrating a first far-end channel filter according to an embodiment.

FIG. 3 is a flowchart illustrating an example of updating a first far-end channel filter according to an embodiment. FIG. 4 is a view illustrating a first far-end channel filter according to an embodiment.

Referring to FIGS. 3 and 4, updating the first far-end channel filter 26 (S100) may include estimating the first variance VAR1 based on the input signal IN_S and the first far-end signal FE_S1 (S110).

According to an embodiment, an initial value IV_S1 of the first variance VAR1 may be yielded based on cross-correlation between the input signal IN_S and the first far-end signal FE_S1 and auto-correlation of the first far-end signal FE_S1.

For example, the first variance VAR1 may be estimated as $\hat{\lambda}_Y[m,k]$ and may be represented in Equation 8.

$$\hat{\lambda}_Y[m,k] = |G_Y[m,k]X[m,k]|^2 \quad \text{[Equation 8]}$$

Here, $G_Y[m,k]$ may be represented in Equation 9.

$$G_Y[m,k] = \sqrt{\frac{[|X[m,k]|^2 - |\hat{D}_L[m,k]|^2]}{|X[m,k]|^2}} \quad \text{[Equation 9]}$$

Here, $|\hat{D}_L[m,k]|$ may be obtained based on the first far-end signal FE_S1 and the input signal IN_S as shown in Equation 10.

$$\Phi_{U_L U_L}[m,k] = \quad \text{[Equation 10]}$$
$$\alpha_\phi \Phi_{U_L U_L}[m-1,k] + (1-\alpha_\phi)U_L^*[m,k]U_L[m,k]$$
$$\Phi_{U_L X}[m,k] = \alpha_\phi \Phi_{U_L X}[m-1,k] +$$
$$(1-\alpha_\phi)U_L^*[m,k]X[m,k]$$
$$|\hat{D}_L[m,k]| = \beta_L \frac{|\Phi_{U_L X}[m,k]|}{\Phi_{U_L U_L}[m,k]}|U_L[m,k]|$$

Here, $U_L[m,k]$ may represent the first far-end signal FE_S1, and X[m,k] may represent the input signal IN_S.

A first cross-correlation vector CCV1 and a first autocorrelation matrix ACM1 may be obtained based on the first variance VAR1 (S130).

For example, the first cross-correlation vector CCV1 and the first autocorrelation matrix ACM1 may be represented in Equation 11 below.

$$g_{L,k} = R_{L,k}^{-1} r_{L,k}$$
$$r_{L,k} = \sum_m \frac{u_{L,m,k} X^*[m,k]}{\lambda_Y[m,k]}$$
$$R_{L,k} = \sum_m \frac{u_{L,m,k} u_{L,m,k}^H}{\lambda_Y[m,k]}$$

[Equation 11]

Here, $r_{L,k}$ and $R_{L,k}$ may be the first cross-correlation vector CCV1 and the first autocorrelation matrix ACM1, respectively.

According to an embodiment, the first cross-correlation vector CCV1 and the first autocorrelation matrix ACM1 may be updated according to the first variance VAR1, and the first far-end channel filter 26 may be updated according to the first cross-correlation vector CCV1 and the first autocorrelation matrix ACM1.

Figure 5:
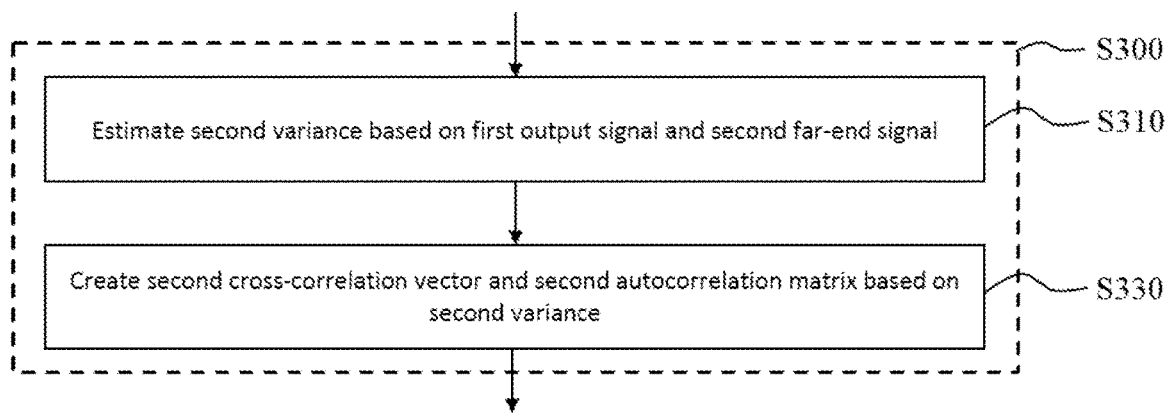
FIG. 5 is a flowchart illustrating an example of updating a second far-end channel filter according to an embodiment.
Figure 6:
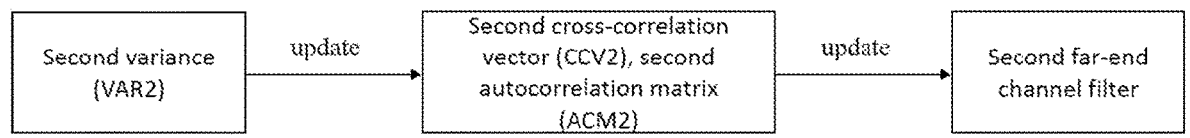
FIG. 6 is a view illustrating a second far-end channel filter according to an embodiment.

FIG. 5 is a flowchart illustrating an example of updating a second far-end channel filter according to an embodiment. FIG. 6 is a view illustrating a second far-end channel filter according to an embodiment.

Referring to FIGS. 5 and 6, updating the second far-end channel filter 27 (S300) may include estimating the second variance VAR2 based on the first output signal OUT_S1 and the second far-end signal FE_S2 (S310).

According to an embodiment, an initial value IV_S2 of the second variance VAR2 may be yielded based on cross-correlation between the first output signal OUT_S1 and the second far-end signal FE_S2 and auto-correlation of the second far-end signal FE_S2.

For example, the second variance VAR2 may be estimated as $\hat{\lambda}_Z[m,k]$ and may be represented in Equation 12.

$$\hat{\lambda}_Z[m,k] = |G_Z[m,k] Y[m,k]|^2$$ [Equation 12]

Here, Gz[m,k] may be represented in Equation 13.

$$G_Z[m,k] = \sqrt{\frac{[|Y[m,k]|^2 - |\hat{D}_R[m,k]|^2]}{|Y[m,k]|^2}}$$ [Equation 13]

Here, $|\hat{D}_R[m,k]|$ may be obtained based on the first output signal OUT_S1 and the second far-end signal FE_S2 as shown in Equation 14.

$$\Phi_{U_R U_R}[m,k] =$$
$$\quad \alpha_\phi \Phi_{U_R U_R}[m-1,k] + (1-\alpha_\phi) U_R^*[m,k] U_R[m,k]$$
$$\Phi_{U_R Y}[m,k] = \alpha_\phi \Phi_{U_R Y}[m-1,k] +$$
$$\quad (1-\alpha_\phi) U_R^*[m,k] Y[m,k]$$
$$|\hat{D}_R[m,k]| = \beta_R \frac{|\Phi_{U_R Y}[m,k]|}{\Phi_{U_R U_R}[m,k]} |U_R[m,k]|$$

[Equation 14]

Here, $U_R[m,k]$ may represent the second far-end signal FE_S1, and Y[m,k] may represent the first output signal OUT_S1.

A second cross-correlation vector CCV2 and a second autocorrelation matrix ACM2 may be obtained based on the second variance VAR2 (S330).

For example, the second cross-correlation vector CCV2 and the second autocorrelation matrix ACM2 may be represented in Equation 15 below.

$$g_{R,k} = R_{R,k}^{-1} r_{R,k}$$
$$r_{R,k} = \sum_m \frac{u_{R,m,k} Y^*[m,k]}{\lambda_Z[m,k]}$$
$$R_{R,k} = \sum_m \frac{u_{R,m,k} u_{R,m,k}^H}{\lambda_Z[m,k]}$$

[Equation 15]

Here, $r_{R,k}$ and $R_{R,k}$ may be the second cross-correlation vector CCV2 and the second autocorrelation matrix ACM2, respectively.

According to an embodiment, the second cross-correlation vector CCV2 and the second autocorrelation matrix ACM2 may be updated according to the second variance VAR2, and the second far-end channel filter 27 may be updated according to the second cross-correlation vector CCV2 and the second autocorrelation matrix ACM2.

Figure 7:
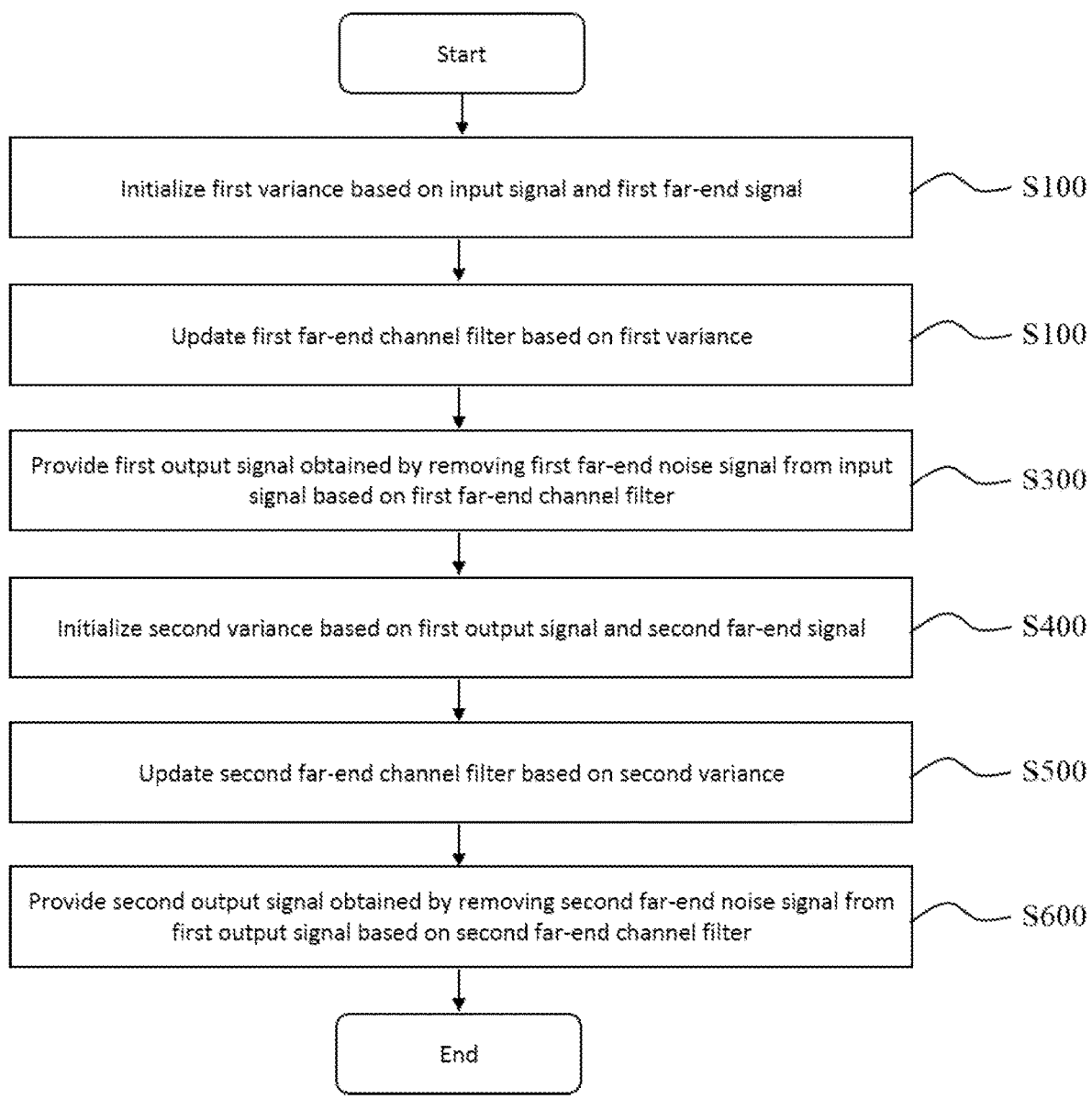
FIG. 7 is a flowchart illustrating a stereo noise cancellation method according to an embodiment.

FIG. 7 is a flowchart illustrating a stereo noise cancellation method according to an embodiment.

Referring to FIG. 7, a noise cancellation method may include initializing a first variance VAR1 based on an input signal IN_S and a first far-end signal included in the input signal IN_S (S100). A first far-end channel filter 26 may be updated based on the first variance VAR1 (S200). The first far-end channel filter 26 may remove the first far-end noise signal from the input signal IN_S, outputting a first output signal OUT_S1 which is free from the first far-end noise signal (S300). A second variance VAR2 of a second far-end signal included in the input signal IN_S and the first output signal OUT_S1 may be initialized (S400). A second far-end channel filter 27 may be updated based on the second variance VAR2 (S500). The second far-end channel filter 27 may remove the second far-end noise signal from the first output signal OUT_S1, outputting a second output signal OUT_S2 free from the second far-end noise signal (S600).

According to an embodiment, the first far-end channel filter 26 may be updated according to a first cross-correlation vector CCV1 and a first autocorrelation matrix ACM1 yielded based on the first variance VAR1.

According to an embodiment, the noise cancellation method may remove stereo echo signals from the input signal IN_S, providing noise-free voice signals.

Figure 8:
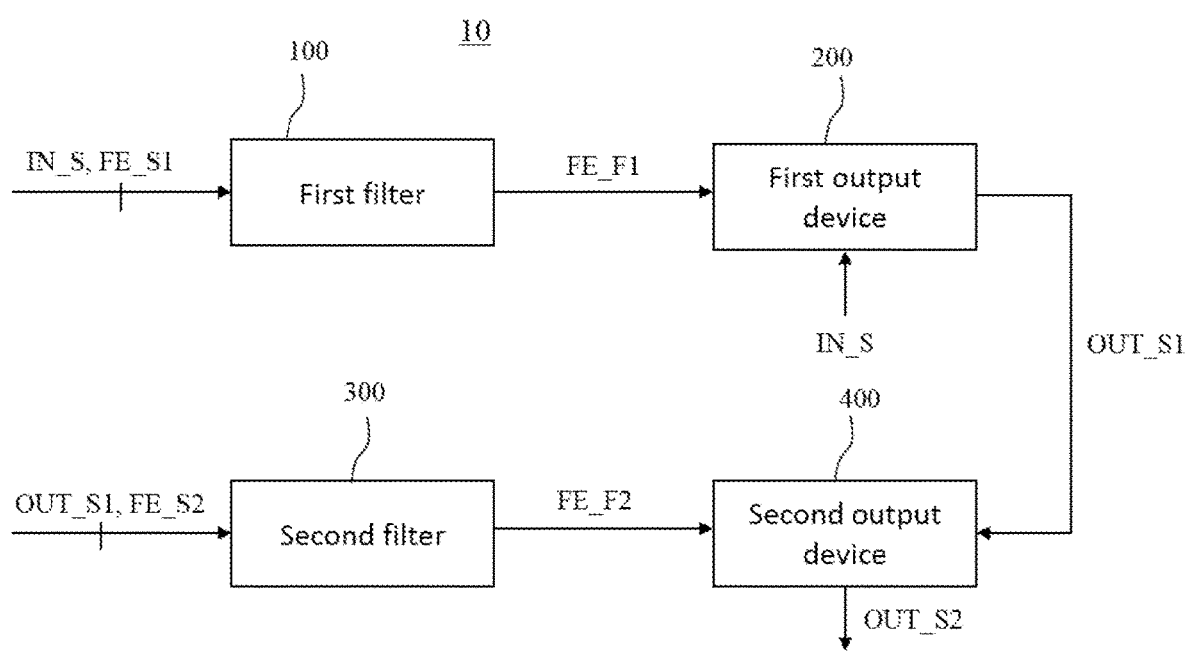
FIG. 8 is a view illustrating a noise cancellation device according to an embodiment.

FIG. 8 is a view illustrating a noise cancellation device according to an embodiment.

Referring to FIG. 8, a noise cancellation device 10 may include a first filter 100, a first output device 200, a second filter 300, and a second output device 400.

The first filter 100 may update a first far-end channel filter 26 according to a first variance VAR1 yielded based on an input signal IN_S and a first far-end signal FE_S1 included in the input signal IN_S. The first output device 200 may provide a first output signal OUT_S1 obtained by removing the first far-end noise signal from the input signal IN_S using the first far-end channel filter 26. The first far-end channel filter 26 may be included in the first filter 100.

The second filter 300 may update a second far-end channel filter 27 according to a second variance VAR2 yielded based on the first output signal OUT_S1 and a second far-end signal FE_S2 included in the input signal IN_S. The second output device 400 may provide a second output signal OUT_S2 obtained by removing the second far-end noise signal from the first output signal OUT_S1 using the second far-end channel filter 27. The second far-end channel filter 27 may be included in the second filter 300.

According to an embodiment, the second far-end channel filter 27 may be updated according to a second cross-correlation vector CCV2 and a second autocorrelation matrix ACM2 yielded based on the second variance VAR2.

Figure 9:
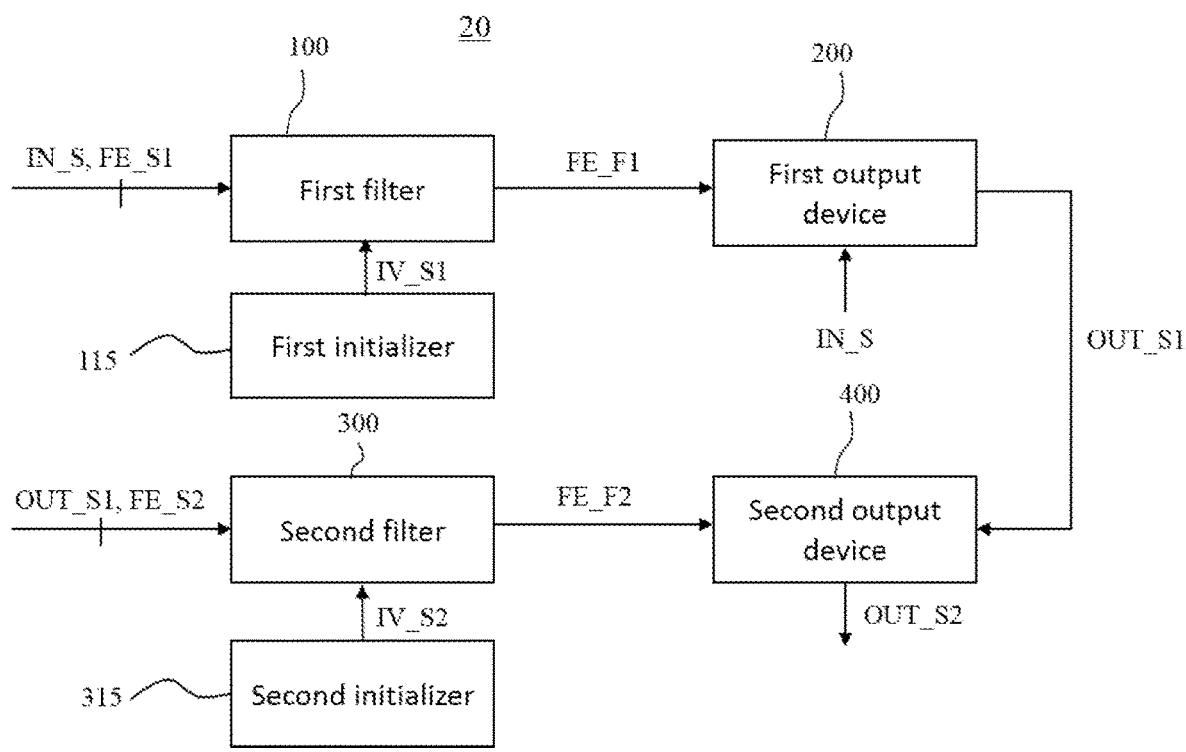
FIG. 9 is a view illustrating a stereo noise cancellation device according to an embodiment.
Figure 10:
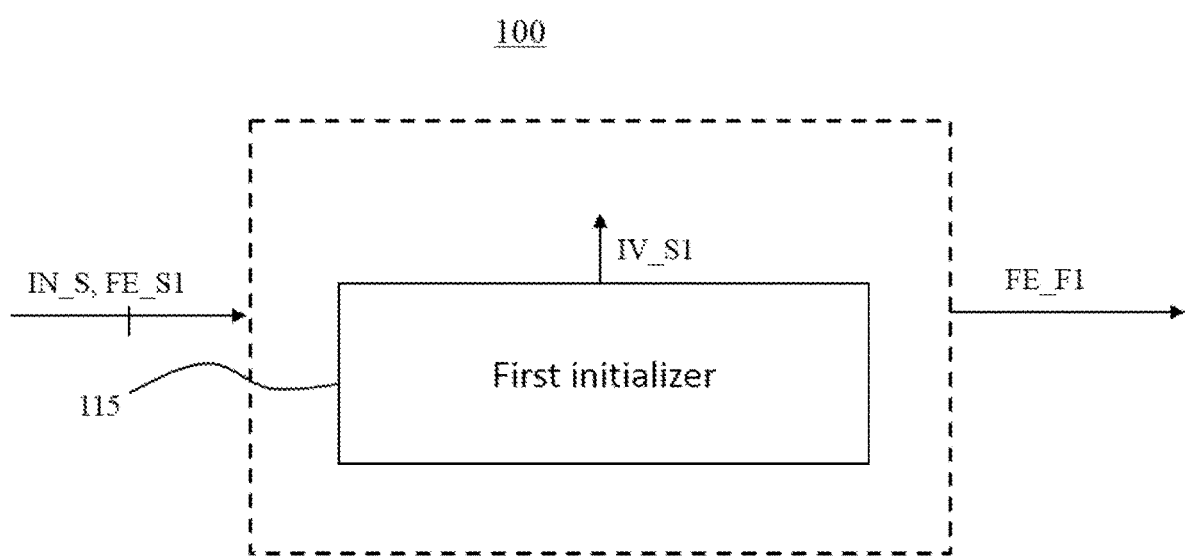
FIG. 10 is a view illustrating an example of a first filter included in a stereo noise cancellation device as illustrated in FIG. 9.
Figure 11:
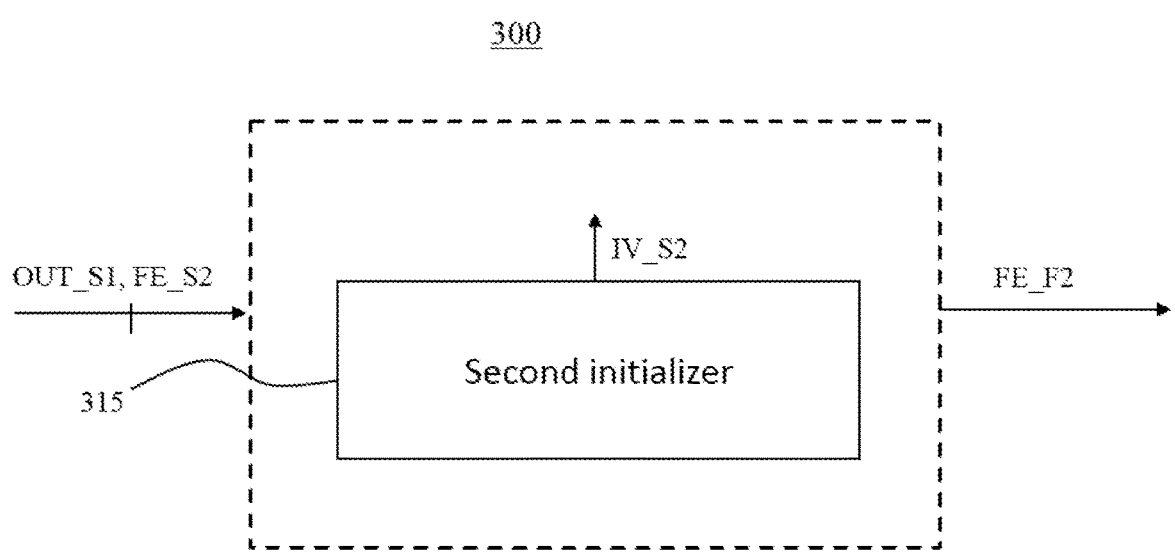
FIG. 11 is a view illustrating an example of a second filter included in a stereo noise cancellation device as illustrated in FIG. 9.

FIG. 9 is a view illustrating a stereo noise cancellation device according to an embodiment. FIG. 10 is a view illustrating an example of a first filter included in a stereo noise cancellation device as illustrated in FIG. 9. FIG. 11 is a view illustrating an example of a second filter included in a stereo noise cancellation device as illustrated in FIG. 9.

Referring to FIGS. 9 to 11, a stereo noise cancellation device may include a first initializer 115, a first filter 100, a first output device 200, a second initializer 315, a second filter 300, and a second output device 400.

The first initializer 115 may initialize a first variance VAR1 of an input signal IN_S and a first far-end signal included in the input signal IN_S. The first filter 100 may update a first far-end channel filter 26 based on the first variance VAR1. The first output device 200 may provide a first output signal OUT_S1 obtained by removing the first far-end noise signal from the input signal IN_S using the first far-end channel filter 26.

The second initializer 315 may initialize a second variance VAR2 based on the first output signal OUT_S1 and a second far-end signal included in the input signal IN_S. The second filter 300 may update the second far-end channel filter 27 based on the second variance VAR2. The second output device 400 may provide a second output signal OUT_S2 obtained by removing the second far-end noise signal from the first output signal OUT_S1 using the second far-end channel filter 27.

According to an embodiment, an initial value IV_S1 of the first variance VAR1 may be yielded based on cross-correlation between the input signal IN_S and the first far-end signal FE_S1 and auto-correlation of the first far-end signal FE_S1.

According to an embodiment, the first initializer 115 may be included in the first filter 100. Alternatively, the first initializer 115 may be disposed outside the first filter 100.

According to an embodiment, the second initializer 315 may be included in the second filter 300. Alternatively, the second initializer 315 may be disposed outside the second filter 300.

Figure 12:
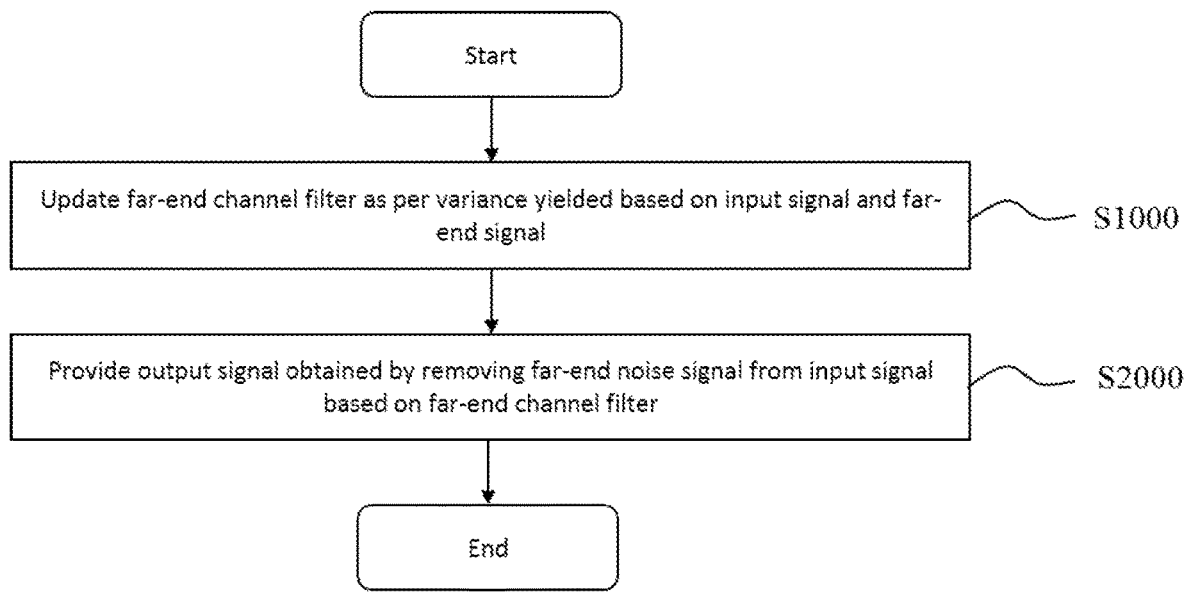
FIG. 12 is a flowchart illustrating a mono noise cancellation method according to an embodiment.
Figure 13:
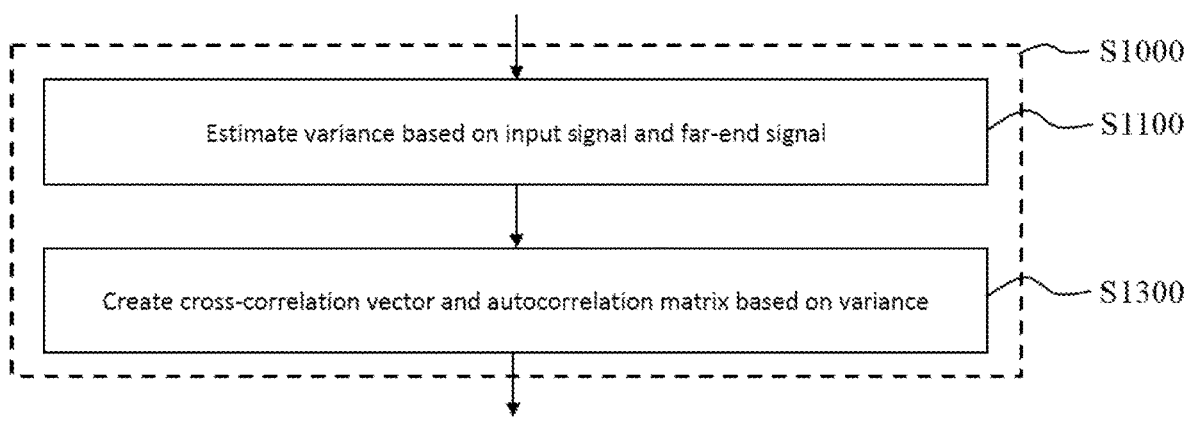
FIG. 13 is a flowchart illustrating an example of updating a far-end channel filter according to an embodiment.

FIG. 12 is a flowchart illustrating a mono noise cancellation method according to an embodiment. FIG. 13 is a flowchart illustrating an example of updating a far-end channel filter according to an embodiment.

Referring to FIGS. 12 and 13, a mono noise cancellation method may include updating a far-end channel filter according to a variance yielded based on an input signal IN_S and a far-end signal FE_S included in the input signal IN_S (S1000). The far-end channel filter may remove the far-end noise signal from the input signal IN_S, outputting an output signal OUT_S which is free from the far-end noise signal.

Updating the far-end channel filter (S1000) may include estimating the variance VAR based on the input signal IN_S and the far-end signal (S1100). A cross-correlation vector and an autocorrelation matrix may be obtained based on the variance VAR (S1300).

The mono noise cancellation method described in connection with FIGS. 12 and 13 may apply where the first far-end signal or the second far-end signal is zero in the embodiments described above in connection with FIG. 1. Although the embodiments of the disclosure focus primarily on mono or stereo noise cancellation, the embodiments of the disclosure may also be applicable where there are three or more noise sources.

Figure 14:
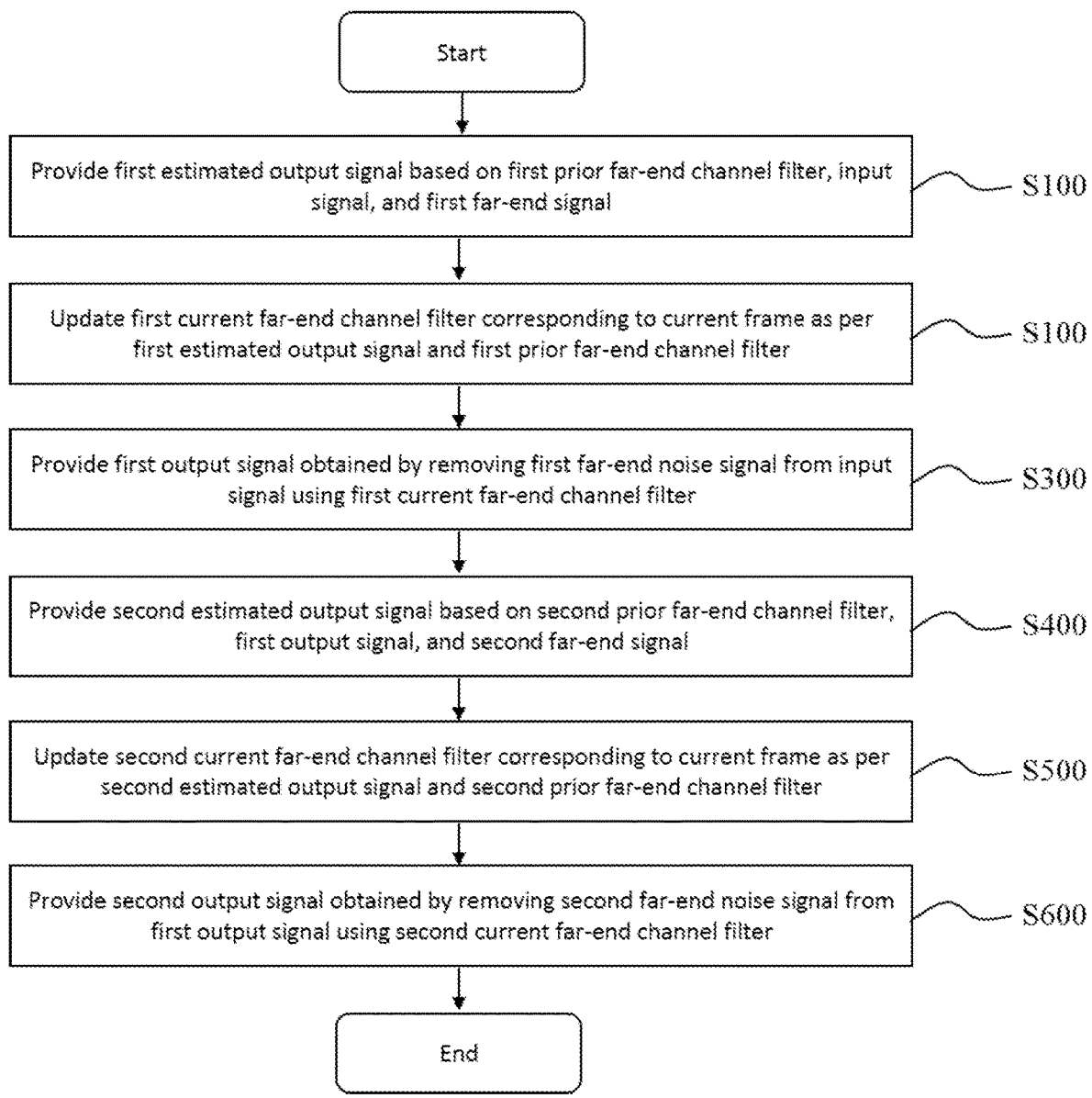
FIG. 14 is a flowchart illustrating a noise cancellation method according to an embodiment.

FIG. 14 is a flowchart illustrating a noise cancellation method according to an embodiment.

Referring to FIGS. 1 and 14, according to an embodiment, a noise cancellation method may provide a first estimated output signal EO_S1 based on a first prior far-end channel filter PFE_F1 corresponding to a prior frame PF, an input signal IN_S, and a first far-end signal FE_S1 (S100). The input signal IN_S may include a near-end signal NE_S, the first far-end signal FE_S1, and a second far-end signal FE_S2.

For example, the near-end signal NE_S may be a pure voice signal free from stereo echo signals (e.g., FE_S1 and FE_S2). The first far-end signal FE_S1 may be an echo signal provided from a first sound source 21, e.g., a speaker, disposed on a first side from a microphone 23. The first side may be a left side of the microphone 23. The second far-end signal FE_S2 may be an echo signal provided from a second sound source 22, e.g., a speaker, disposed on a second side from the microphone 23. The second side may be a right side of the microphone 23.

For example, a second frame may be provided after the first frame. Where the second frame is a current frame CF, the first frame may be a prior frame PF. In this case, the first prior far-end channel filter PFE_F1 may be a far-end channel filter on a first side of the first frame.

The first estimated output signal EO_S1 may be expressed as $\hat{Y}[m,k]$ and be represented as shown in Equation 16.

$$\hat{Y}[m,k]=X[m,k]-g_{L,m-1,k}^{H}u_{L,m,k} \qquad \text{[Equation 16]}$$

Here, $X[m,k]$ is the input signal IN_S, $g_{L,m-1,k}^{H}$ is the first prior far-end channel filter PFE_F1, $u_{L,m,k}$ is the first far-end signal FE_S1, m is the frame index, and k is the frequency index.

A first current far-end channel filter CFE_F1 corresponding to the current frame CF may be updated according to the first estimated output signal EO_S1 and the first prior far-end channel filter PFE_F1 (S200). For example, a second frame may be provided after the first frame. Where the second frame is a current frame CF, the first frame may be a prior frame PF. In this case, the first current far-end channel filter CFE_F1 may be a far-end channel filter on the first side of the second frame.

The first current far-end channel filter CFE_F1 may be expressed as $g_{L,m,k}$ and be represented as shown in Equation 17.

$$g_{L,m,k}=g_{L,m-1,k}+k_{L,m,k}\hat{Y}^{*}[m,k] \qquad \text{[Equation 17]}$$

Here, $g_{L,m,k}$ is the first current far-end channel filter CFE_F1, $g_{L,m-1,k}$ is the first prior far-end channel filter PFE_F1, and $k_{L,m,k}$ is the first Kalman gain.

The first current far-end channel filter CFE_F1 and the first prior far-end channel filter PFE_F1 may be included in a first far-end channel filter FE_F1.

The first current far-end channel filter CFE_F1 may remove the first far-end noise signal from the input signal IN_S, outputting the first output signal OUT_S1 free from the first far-end noise signal (S300). The first output signal OUT_S1 may be expressed as Y[m,k] and be represented as shown in Equation 18.

$$Y[m,k]=X[m,k]-g_{L,m,k}^{H}u_{L,m,k} \quad \text{[Equation 18]}$$

Here, X[m,k] is the input signal IN_S, $g_{L,m,k}^{H}$ is the first current far-end channel filter CFE_F1, and $u_{L,m,k}$ is the first far-end signal FE_S1.

A second estimated output signal EO_S2 may be provided based on a second prior far-end channel filter corresponding to the prior frame PF, the first output signal OUT_S1, and a second far-end signal FE_S2 (S400).

For example, the second frame may be provided after the first frame. Where the second frame is a current frame CF, the first frame may be a prior frame PF. In this case, the second prior far-end channel filter PFE_F2 may be a far-end channel filter on a second side of the first frame.

The second estimated output signal EO_S2 may be expressed as $\hat{Z}$[m,k] and be represented as shown in Equation 19.

$$\hat{Z}[m,k]=Y[m,k]-g_{R,m-1,k}^{H}u_{R,m,k} \quad \text{[Equation 19]}$$

Here, Y[m,k] is the first output signal OUT_S1, $g_{R,m-1,k}^{H}$ is the second prior far-end channel filter PFE_F2, $u_{R,m,k}$ is the second far-end signal FE_S2, m is the frame index, and k is the frequency index.

The second current far-end channel filter CFE_F2 corresponding to the current frame CF may be updated according to the second estimated output signal EO_S2 and the second prior far-end channel filter PFE_F2 (S500). For example, a second frame may be provided after the first frame. Where the second frame is a current frame CF, the first frame may be a prior frame PF. In this case, the second current far-end channel filter CFE_F2 may be a far-end channel filter on the second side of the second frame.

The second current far-end channel filter CFE_F2 may be expressed as $g_{R,m,k}$ and be represented as shown in Equation 20.

$$g_{R,m,k}=g_{R,m-1,k}+k_{R,m,k}\hat{Z}^{*}[m,k] \quad \text{[Equation 20]}$$

Here, $g_{R,m,k}$ is the second current far-end channel filter CFE_F2, the second $g_{R,m-1,k}$ is prior far-end channel filter PFE_F2, and $k_{R,m,k}$ is the second Kalman gain.

The second current far-end channel filter CFE_F2 and the second prior far-end channel filter PFE_F2 may be included in a second far-end channel filter FE_F2.

The second current far-end channel filter CFE_F2 may remove the second far-end noise signal from the first output signal OUT_S1, outputting the second output signal OUT_S2 free from the second far-end noise signal (S600). The second output signal OUT_S2 may be expressed as Z[m,k] and be represented as shown in Equation 21.

$$Z[m,k]=Y[m,k]-g_{R,m,k}^{H}u_{R,m,k} \quad \text{[Equation 21]}$$

Here, Y[m,k] is the first output signal OUT_S1, $g_{R,m,k}^{H}$ is the second current far-end channel filter CFE_F2, and $u_{R,m,k}$ is the second far-end signal FE_S2.

According to an embodiment, the noise cancellation method may remove stereo echo signals from the input signal IN_S, providing noise-free voice signals.

Although examples of removing stereo echo signals are shown and described herein, embodiments of the disclosure are not limited thereto but may also be applicable to removal of mono echo signals.

Figure 15:
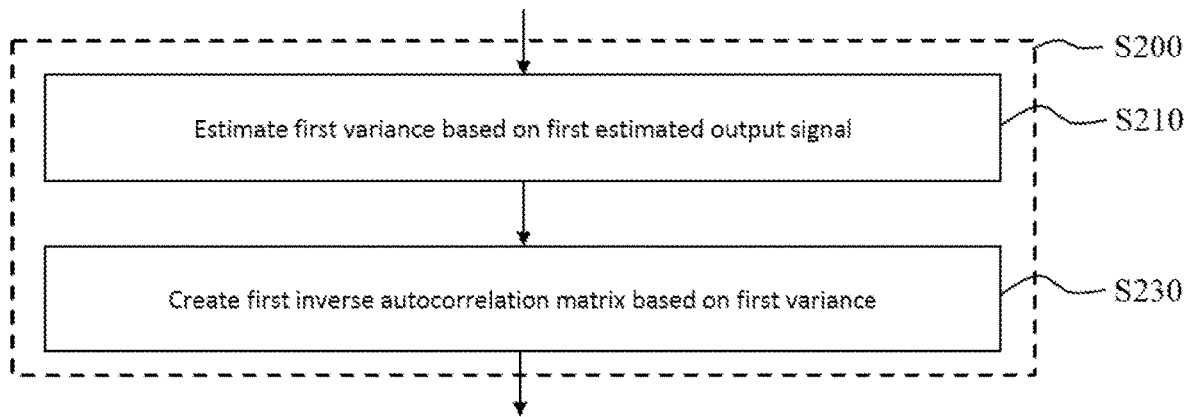
FIG. 15 is a flowchart illustrating an example of updating a first current far-end channel filter according to an embodiment.
Figure 16:
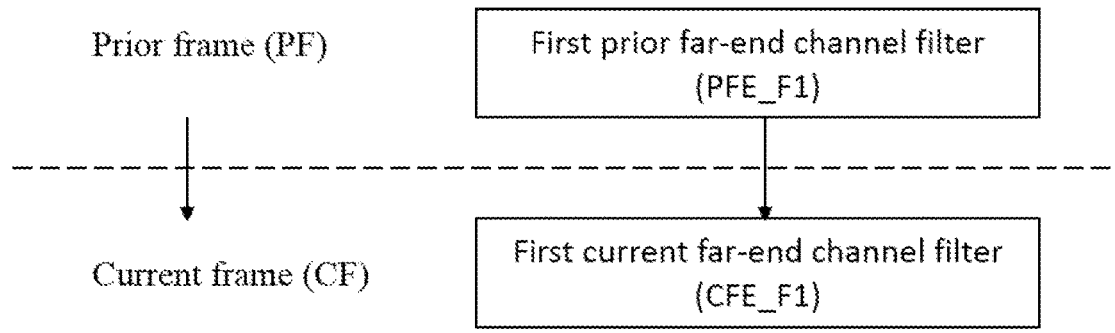
FIG. 16 is a view illustrating a first far-end channel filter varying according to frames.
Figure 17:
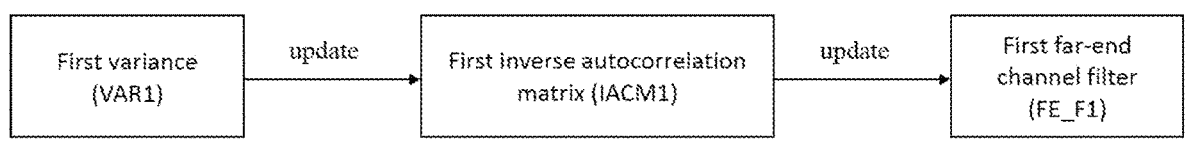
FIG. 17 is a view illustrating a first far-end channel filter according to an embodiment.

FIG. 15 is a flowchart illustrating an example of updating a first current far-end channel filter according to an embodiment. FIG. 16 is a view illustrating a first far-end channel filter varying according to frames. FIG. 17 is a view illustrating a first far-end channel filter according to an embodiment.

Referring to FIGS. 15 to 17, updating the first current far-end channel filter CFE_F1 may include estimating a first variance VAR1 based on the first estimated output signal EO_S1 (S210).

For example, the first variance VAR1 may be $\lambda_Y$[m,k] and be represented as shown in Equation 22.

$$\lambda_Y[m,k]=\hat{\lambda}_Y[m,k] \quad \text{[Equation 22]}$$

Here, $\hat{\lambda}_Y$[m,k] is the estimated variance that may be yielded based on cross-correlation between the input signal IN_S and the first far-end signal FE_S1 and autocorrelation of the first far-end signal FE_S1.

According to an embodiment, the first variance VAR1 may be determined by the first estimated output signal EO_S1 provided based on the first prior far-end channel filter PFE_F1. The first variance VAR1 may be determined by the product of a first weight and the square of the absolute value of the first estimated output signal EO_S1.

A first inverse autocorrelation matrix IACM1 may be yielded based on the first variance VAR1 (S220).

For example, the first inverse autocorrelation matrix IACM1 may be represented in Equation 23 below.

$$k_{L,m,k} = \frac{\Psi_{L,m-1,k}u_{L,m,k}}{\gamma_{L,k}\lambda_Y[m,k] + u_{L,m,k}^{H}\Psi_{L,m-1,k}u_{L,m,k}} \quad \text{[Equation 23]}$$

$$\Psi_{L,m,k} = \gamma_{L,k}^{-1}(\Psi_{L,m-1,k} - k_{L,m,k}u_{L,m,k}^{H}\Psi_{L,m-1,k})$$

$$g_{L,m,k} = g_{L,m-1,k} + k_{L,m,k}\hat{Y}^{*}[m,k]$$

Here, $\Psi_{L,m,k}$ and $\gamma_{L,k}^{-1}$ may be included in the first inverse autocorrelation matrix IACM1.

According to an embodiment, the first current far-end channel filter CFE_F1 may converge to a constant value.

Figure 18:
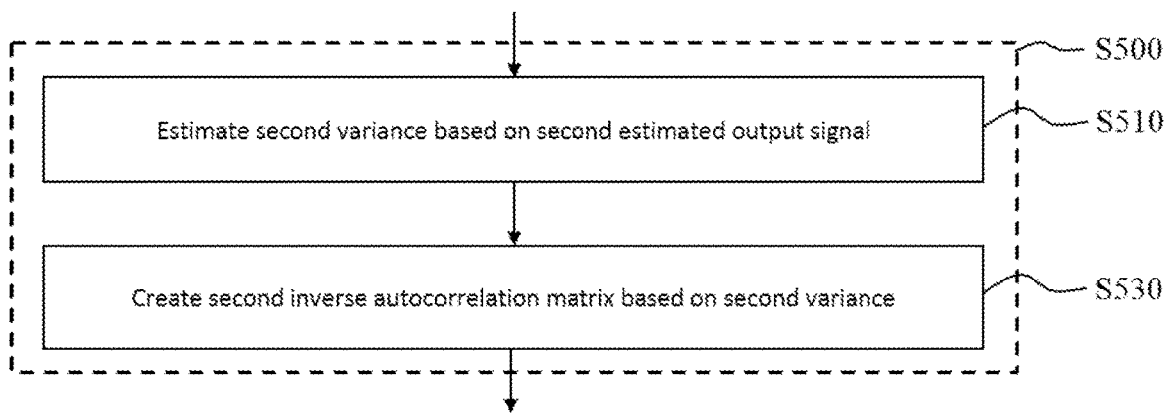
FIG. 18 is a flowchart illustrating an example of updating a second current far-end channel filter according to an embodiment.
Figure 19:
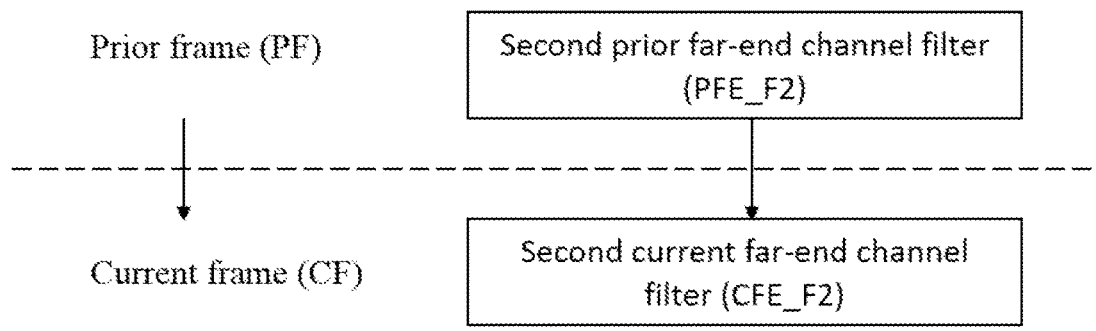
FIG. 19 is a view illustrating a second far-end channel filter varying according to frames.
Figure 20:
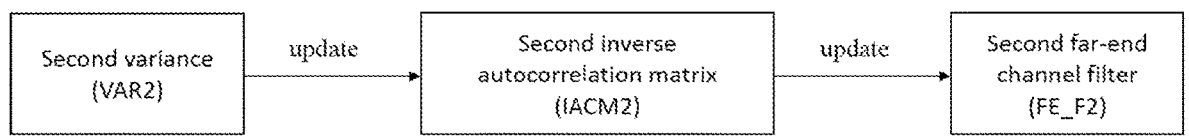
FIG. 20 is a view illustrating a second far-end channel filter according to an embodiment.

FIG. 18 is a flowchart illustrating an example of updating a second current far-end channel filter CFE_F2 according to an embodiment. FIG. 19 is a view illustrating a second far-end channel filter varying according to frames. FIG. 20 is a view illustrating a second far-end channel filter according to an embodiment.

Referring to FIGS. 18 to 20, according to an embodiment, updating the second current far-end channel filter CFE_F2 may include estimating a second variance VAR2 based on the second estimated output signal EO_S2 (S510).

For example, the second variance VAR2 may be $\lambda_Z$[m,k] and be represented as shown in Equation 24.

$$\lambda_Z[m,k]=\hat{\lambda}_Z[m,k] \quad \text{[Equation 24]}$$

Here, $\hat{\lambda}_Z$[m,k] is the estimated variance that may be yielded based on cross-correlation between the first output signal OUT_S1 and the second far-end signal FE_S2 and autocorrelation of the second far-end signal FE_S2.

According to an embodiment, the second variance VAR2 may be determined by the second estimated output signal EO_S2 provided based on the second prior far-end channel filter PFE_F2. The second variance VAR2 may be determined by the product of a second weight and the square of the absolute value of the second estimated output signal EO_S2.

A second inverse autocorrelation matrix IACM2 may be yielded based on the second variance VAR1 (S520).

For example, the second inverse autocorrelation matrix IACM2 may be represented in Equation 25 below.

$$k_{R,m,k} = \frac{\Psi_{R,m-1,k} u_{R,m,k}}{\gamma_{R,k}\lambda_Z[m,k] + u_{R,m,k}^H \Psi_{R,m-1,k} u_{R,m,k}} \quad \text{[Equation 25]}$$

$$\Psi_{R,m,k} = \gamma_{R,k}^{-1}(\Psi_{R,m-1,k} - k_{R,m,k} u_{R,m,k}^H \Psi_{R,m-1,k})$$

$$g_{R,m,k} = g_{R,m-1,k} + k_{R,m,k}\hat{Z}^*[m,k]$$

Here, $\Psi_{R,m,k}$ and $\gamma_{R,k}^{-1}$ may be included in the second inverse autocorrelation matrix IACM2.

According to an embodiment, the second current far-end channel filter CFE_F2 may converge to a constant value. According to an embodiment, the noise cancellation method may remove stereo echo signals from the input signal IN_S, providing noise-free voice signals.

Figure 21:
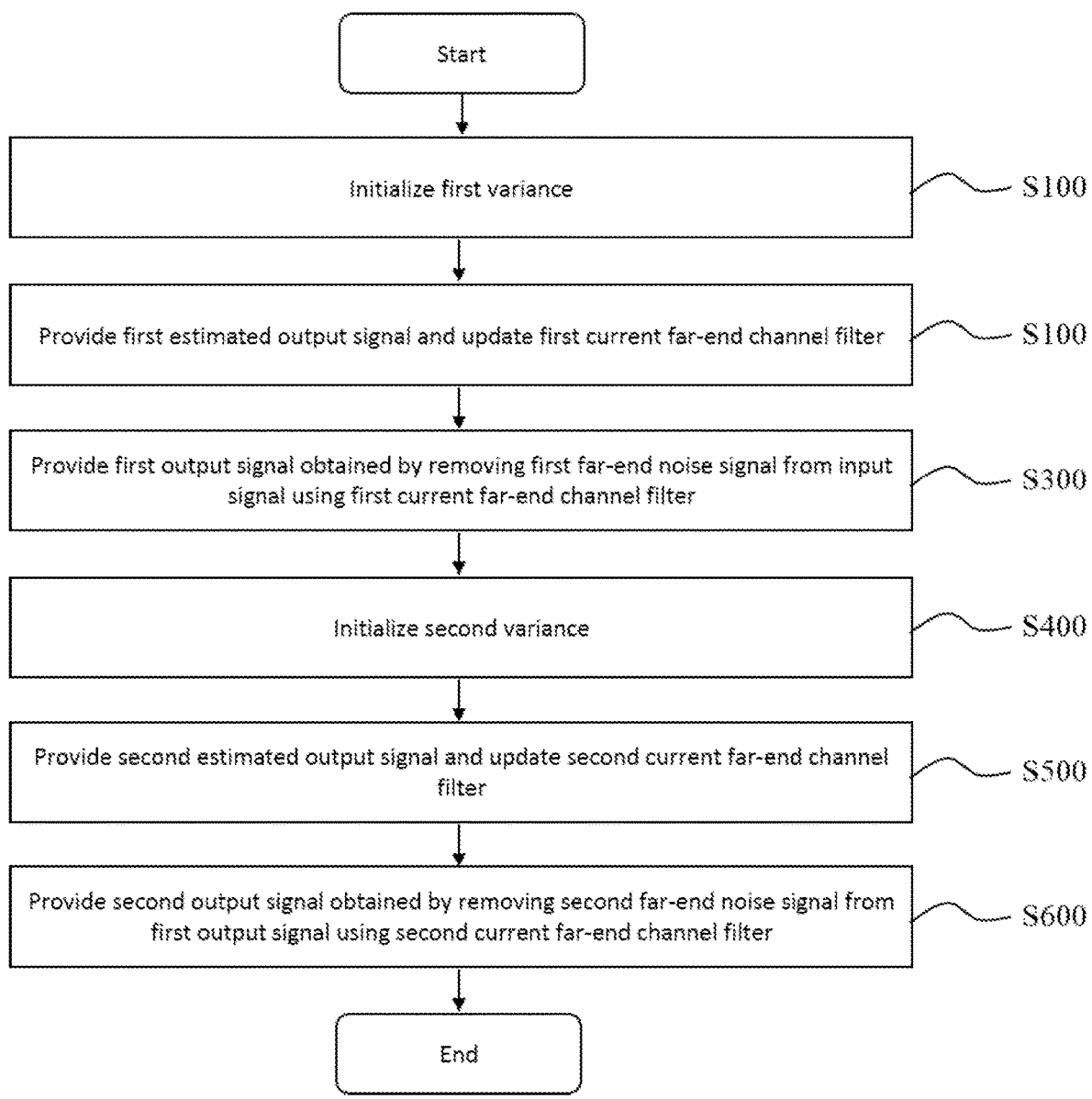
FIG. 21 is a flowchart illustrating a stereo noise cancellation method according to an embodiment.

FIG. 21 is a flowchart illustrating a stereo noise cancellation method according to an embodiment.

Referring to FIGS. 1 and 14 to 21, according to an embodiment, the stereo noise cancellation method may include initializing the first variance (S100). The first estimated output signal EO_S1 may be provided based on the first prior far-end channel filter corresponding to the prior frame PF, the input signal IN_S, and the first far-end signal FE_S1, and the first current far-end channel filter CFE_F1 corresponding to the current frame CF may be updated according to the first estimated output signal EO_S1, the first prior far-end channel filter PFE_F1, and the first variance VAR1 (S200). The first current far-end channel filter CFE_F1 may remove the first far-end noise signal from the input signal IN_S, outputting the first output signal OUT_S1 free from the first far-end noise signal (S300).

The second variance may be initialized (S400). The second estimated output signal EO_S2 may be provided based on the second prior far-end channel filter corresponding to the prior frame PF, the first output signal OUT_S1, and the second far-end signal FE_S2, and the second current far-end channel filter CFE_F2 corresponding to the current frame CF may be updated according to the second estimated output signal EO_S2, the second prior far-end channel filter PFE_F2, and the second variance VAR2 (S500). The second current far-end channel filter CFE_F2 may remove the second far-end noise signal from the first output signal OUT_S1, outputting the second output signal OUT_S2 free from the second far-end noise signal (S600).

According to an embodiment, the first variance VAR1 may be determined by the first estimated output signal EO_S1 provided based on the first prior far-end channel filter PFE_F1, and the second variance VAR2 may be determined by the second estimated output signal EO_S2 provided based on the second prior far-end channel filter PFE_F2. According to an embodiment, the stereo noise cancellation method may remove stereo echo signals from the input signal IN_S, providing noise-free voice signals.

Figure 22:
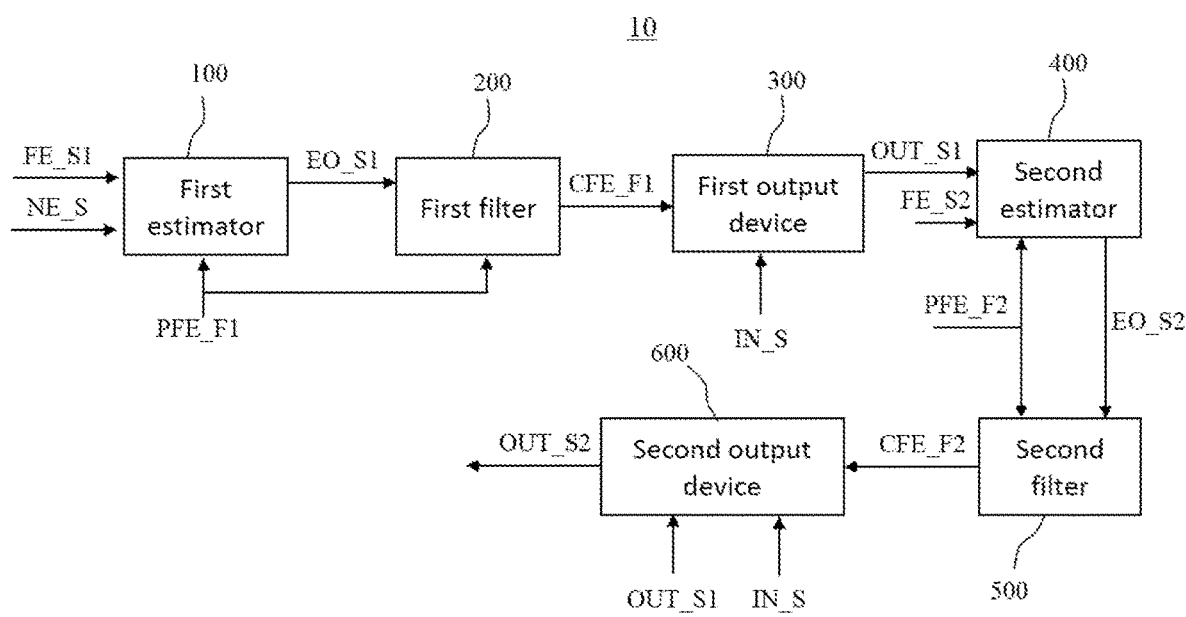
FIG. 22 is a view illustrating a noise cancellation device according to an embodiment.

FIG. 22 is a view illustrating a noise cancellation device according to an embodiment.

Referring to FIGS. 1 and 14 to 22, a stereo noise cancellation device 10 may include a first estimator 100, a first filter 200, a first output device 300, a second estimator 400, a second filter 500, and a second output device 600.

The first estimator 100 may provide a first estimated output signal EO_S1 based on a first prior far-end channel filter corresponding to a prior frame PF, an input signal IN_S, and a first far-end signal FE_S1. The first filter 200 may update a first current far-end channel filter CFE_F1 corresponding to a current frame CF according to the first estimated output signal EO_S1 and the first prior far-end channel filter PFE_F1. The first output device 300 may provide a first output signal OUT_S1 obtained by removing the first far-end noise signal from the input signal IN_S using the first far-end channel filter CFE_F1.

The second estimator 400 may provide a second estimated output signal EO_S2 based on a second prior far-end channel filter corresponding to the prior frame PF, the first output signal OUT_S1, and the second far-end signal FE_S2. The second filter 500 may update the second current far-end channel filter CFE_F2 corresponding to the current frame CF according to the second estimated output signal EO_S2 and the second prior far-end channel filter PFE_F2. The second output device 600 may provide a second output signal OUT_S2 obtained by removing the second far-end noise signal from the first output signal OUT_S1 using the second current far-end channel filter CFE_F2.

According to an embodiment, a first variance VAR1 may be determined by the product of a first weight and the square of the absolute value of the first estimated output signal EO_S1, and a second variance VAR2 may be determined by the product of a second weight and the square of the absolute value of the second estimated output signal EO_S2.

Figure 23:
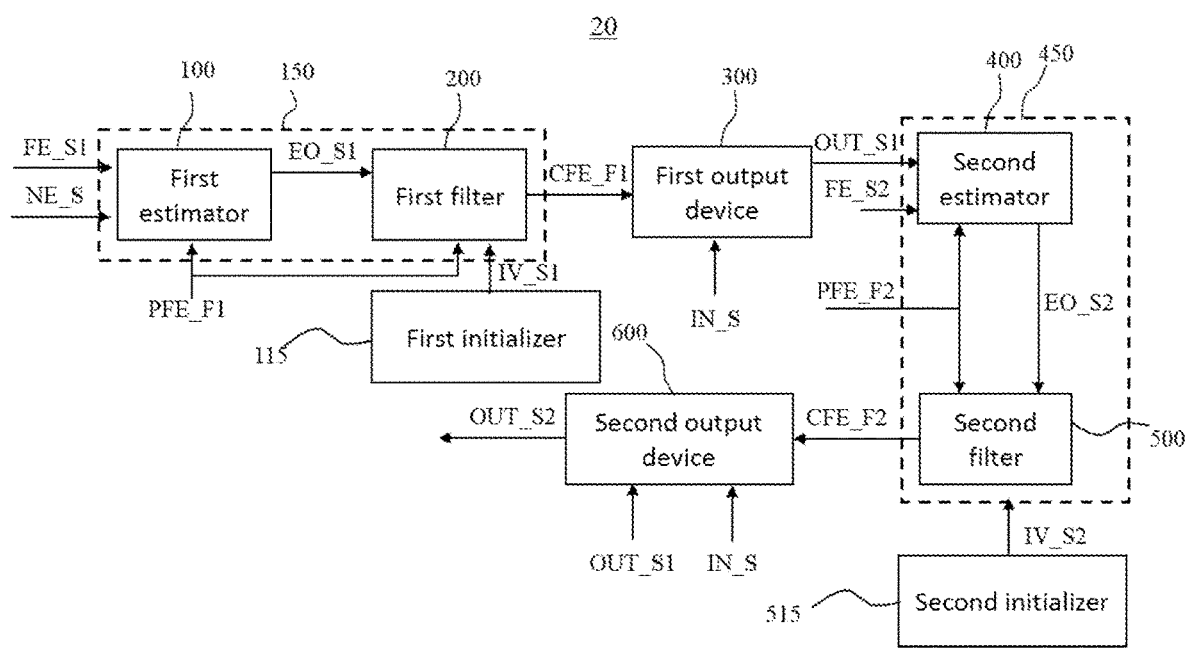
FIG. 23 is a view illustrating a stereo noise cancellation device according to an embodiment.

FIG. 23 is a view illustrating a stereo noise cancellation device according to an embodiment.

Referring to FIGS. 1 and 14 to 23, a stereo noise cancellation device 20 may include a first initializer 115, a first updater 150, a first output device 300, a second initializer 515, a second updater 450, and a second output device 600.

The first initializer 115 may initialize a first initial variance IV_S1. The first updater 150 may include a first estimator 100 and a first filter 200.

The first estimator 100 may provide a first estimated output signal EO_S1 based on a first prior far-end channel filter corresponding to a prior frame PF, an input signal IN_S, and a first far-end signal FE_S1. The first filter 200 may update a first current far-end channel filter CFE_F1 corresponding to a current frame CF according to the first estimated output signal EO_S1, the first prior far-end channel filter PFE_F1, and the first variance VAR1. The first output device 300 may provide a first output signal OUT_S1 obtained by removing the first far-end noise signal from the input signal IN_S using the first far-end channel filter CFE_F1.

The second initializer 515 may initialize a second initial variance IV_S2. The second updater 450 may include a second estimator 400 and a second filter 500.

The second estimator 400 may provide a second estimated output signal EO_S2 based on a second prior far-end channel filter corresponding to the prior frame PF, the first output signal OUT_S1, and the second far-end signal FE_S2. The second filter 500 may update the second current far-end channel filter CFE_F2 corresponding to the current frame CF according to the second estimated output signal EO_S2, the second prior far-end channel filter PFE_F2, and the second variance VAR2. The second output device 600 may provide a second output signal OUT_S2 obtained by removing the second far-end noise signal from the first output signal OUT_S1 using the second current far-end channel filter CFE_F2.

According to an embodiment, the first current far-end channel filter CFE_F1 and the second current far-end channel filter CFE_F2 may converge to a constant value. According to an embodiment, the stereo noise cancellation method may remove stereo echo signals from the input signal IN_S, providing noise-free voice signals.

Figure 24:
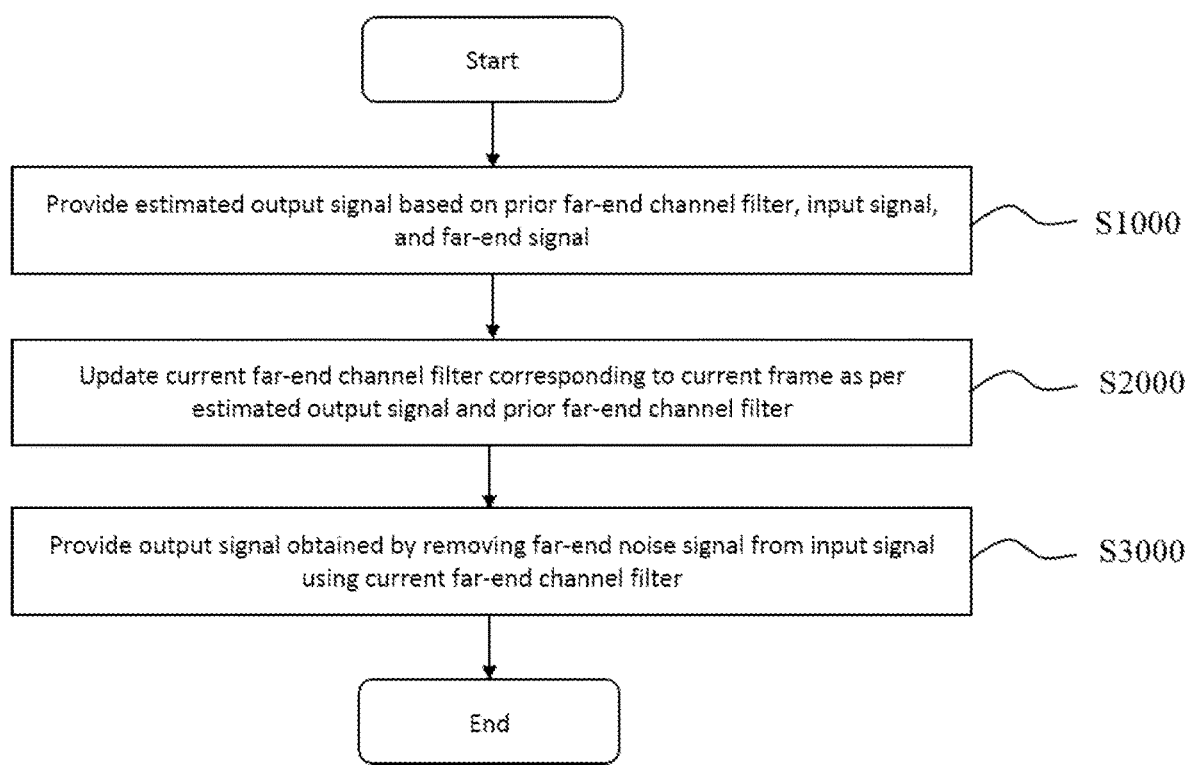
FIG. 24 is a flowchart illustrating a mono noise cancellation method according to an embodiment.
Figure 25:
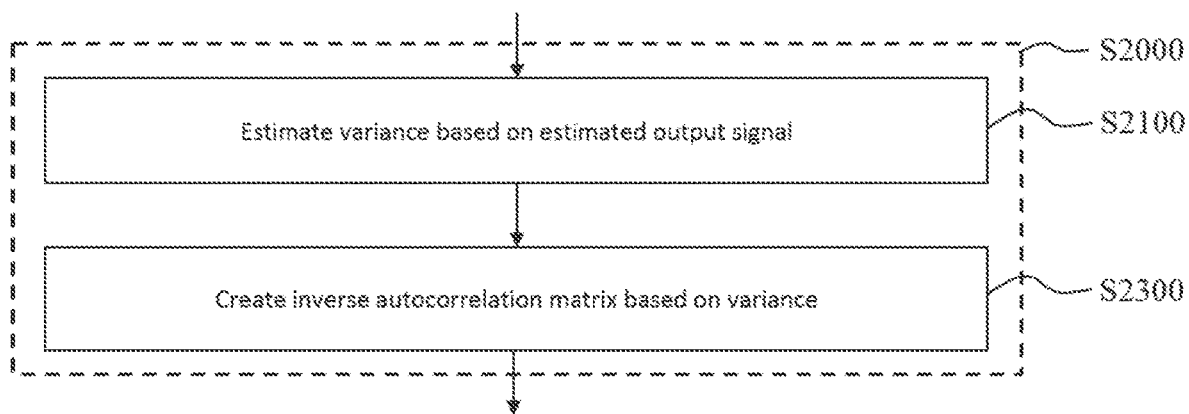
FIG. 25 is a flowchart illustrating an example of updating a current far-end channel filter according to an embodiment.

FIG. 24 is a flowchart illustrating a mono noise cancellation method according to an embodiment. FIG. 25 is a flowchart illustrating an example of updating a current far-end channel filter according to an embodiment.

Referring to FIGS. 24 and 25, according to an embodiment, a noise cancellation method may provide an estimated output signal EO_S based on a prior far-end channel filter PFE_F corresponding to a prior frame, an input signal IN_S, and a far-end signal FE_S (S1000). A current far-end channel filter corresponding to the current frame may be updated according to the estimated output signal EO_S and the prior far-end channel filter PFE_F (S2000), The current far-end channel filter CFE_F may remove the far-end noise signal from the input signal, outputting the output signal OUT_S free from the far-end noise signal (S3000).

Updating the current far-end channel filter CFE_F may include estimating a variance VAR based on the estimated output signal EO_S (S2100). An inverse autocorrelation matrix may be yielded based on the variance (S2300).

The mono noise cancellation method described in connection with FIGS. 24 and 25 may apply where the first far-end signal or the second far-end signal is zero in the embodiments described above in connection with FIG. 1. Although the embodiments of the disclosure focus primarily on mono or stereo noise cancellation, the embodiments of the disclosure may also be applicable where there are three or more noise sources.

The noise cancellation device according to various embodiments may be one of various types of electronic devices including, but not limited to, at least one of, e.g., a portable communication device (e.g., a smartphone), a computer device, a portable multimedia device, a portable medical device, a camera, a wearable device, or a home appliance.

It should be appreciated that various embodiments of the disclosure and the terms used therein are not intended to limit the techniques set forth herein to particular embodiments and that various changes, equivalents, and/or replacements therefor also fall within the scope of the disclosure. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may modify corresponding components regardless of importance and/or order and are used to distinguish a component from another without limiting the components.

As used herein, the term "module" includes a unit configured in hardware, software, or firmware and may interchangeably be used with other terms, e.g., "logic," "logic block," "part," "circuit," or "device." A module may be a single integral part or a minimum unit or part for performing one or more functions. For example, the module may be configured in an application-specific integrated circuit (ASIC).

Various embodiments as set forth herein may be implemented as software including one or more instructions that are stored in a machine-readable or computer-readable storage medium (e.g., a transitory memory or a non-transitory memory) that is readable by a machine (e.g., the noise cancellation device) or a processor.

For example, a processor of the noise cancellation device may invoke at least one of the one or more instructions stored in the storage medium, and execute it, with or without using one or more other components under the control of the processor. This allows the noise cancellation device to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the disclosure has been shown and described in connection with exemplary embodiments thereof, it will be appreciated by one of ordinary skill in the art that various changes or modifications may be made thereto without departing from the scope of the disclosure.

What is claimed is:

1. A noise cancellation method, comprising:
updating a first far-end channel filter according to a first variance yielded based on an input signal and a first far-end signal included in the input signal;
providing a first output signal obtained by removing a first far-end noise signal from the input signal through the first far-end channel filter;
updating a second far-end channel filter according to a second variance yielded based on the first output signal and a second far-end signal included in the input signal; and
providing a second output signal obtained by removing a second far-end noise signal from the first output signal through the second far-end channel filter, wherein updating the first far-end channel filter includes estimating the first variance based on the input signal and the first far-end signal and creating a first cross-correlation vector and a first autocorrelation matrix based on the first variance.

2. The noise cancellation method of claim 1, wherein an initial value of the first variance is obtained by cross correlation between the input signal and the first far-end signal and autocorrelation of the first far-end signal.

3. The noise cancellation method of claim 1, wherein the first cross-correlation vector and the first autocorrelation matrix are updated according to the first variance.

4. The noise cancellation method of claim 1, wherein the first far-end channel filter is updated according to the first cross-correlation vector and the first autocorrelation matrix.

5. The noise cancellation method of claim 1, further comprising:
  initializing the first variance; and
  initializing the second variance.

6. The noise cancellation method of claim 5, wherein the first far-end channel filter is updated according to a first cross-correlation vector and a first autocorrelation matrix obtained based on the first variance.

7. A noise cancellation method, comprising:
  updating a first far-end channel filter according to a first variance yielded based on an input signal and a first far-end signal included in the input signal;
  providing a first output signal obtained by removing a first far-end noise signal from the input signal through the first far-end channel filter;
  updating a second far-end channel filter according to a second variance yielded based on the first output signal and a second far-end signal included in the input signal; and
  providing a second output signal obtained by removing a second far-end noise signal from the first output signal through the second far-end channel filter, wherein updating the second far-end channel filter includes estimating the second variance based on the first output signal and the second far-end signal and creating a cross-correlation vector and an autocorrelation matrix based on the second variance.

8. The noise cancellation method of claim 7, wherein an initial value of the second variance is obtained by cross correlation between the output signal and the second far-end signal and autocorrelation of the second far-end signal.

9. The noise cancellation method of claim 7, wherein the second cross-correlation vector and the second autocorrelation matrix are updated according to the second variance.

10. The noise cancellation method of claim 9, wherein the second far-end channel filter is updated according to the second cross-correlation vector and the second autocorrelation matrix.

11. A noise cancellation method, comprising:
  providing a first estimated output signal based on a first prior far-end channel filter corresponding to a prior frame, an input signal, and a first far-end signal;
  updating a first current far-end channel filter corresponding to a current frame according to the first estimated output signal and the first prior far-end channel filter;
  providing a first output signal obtained by removing a first far-end noise signal from the input signal using the first current far-end channel filter;
  providing a second estimated output signal based on a second prior far-end channel filter corresponding to the prior frame, the first output signal, and a second far-end signal;
  updating the second current far-end channel filter corresponding to the current frame according to the second estimated output signal and the second prior far-end channel filter; and
  providing a second output signal obtained by removing a second far-end noise signal from the first output signal using the second current far-end channel filter, wherein updating the first current far-end channel filter includes estimating a first variance based on the first estimated output signal and creating a first inverse autocorrelation matrix based on the first variance.

12. The noise cancellation method of claim 11, wherein the first variance is determined by the first estimated output signal provided based on the first prior far-end channel filter.

13. The noise cancellation method of claim 12, wherein the first variance is determined by the product of a first weight and the square of the absolute value of the first estimated output signal.

14. The noise cancellation method of claim 13, wherein the first current far-end channel filter converges to a constant value.

15. The noise cancellation method of claim 11, wherein updating the second current far-end channel filter includes estimating a second variance based on the second estimated output signal and creating a second inverse autocorrelation matrix based on the second variance.

16. The noise cancellation method of claim 15, wherein the second variance is determined by the second estimated output signal provided based on the second prior far-end channel filter.

17. The noise cancellation method of claim 16, wherein the second variance is determined by the product of a second weight and the square of the absolute value of the second estimated output signal.

* * * * *